Jan. 7, 1947.  R. W. SHAFOR  2,413,791
FRACTIONATION OF SOLUTES
Filed May 9, 1942  2 Sheets-Sheet 1

INVENTOR
RALPH W. SHAFOR
BY
ATTORNEY

Patented Jan. 7, 1947

2,413,791

UNITED STATES PATENT OFFICE 2,413,791

FRACTIONATION OF SOLUTES

Ralph W. Shafor, New York, N. Y., assignor to The Dorr Company, a corporation of Delaware Application May 9, 1942, Serial No. 442,385

5 Claims. (Cl. 23—1)

This invention relates to the purification of sugar-bearing solutions or sugar juices by treatment with ion exchange materials whereby the solution is subjected sequentially to treatment in a cation and an anion exchanger bed, and more specifically this relates to a method of operation coupled with such ion exchange treatment, whereby certain non-sugar solutes in the juice can be isolated and recovered.

This invention is based on the discovery that ion exchange material, for example the synthetic resinous kind, will selectively take up from the sugar-bearing solution certain non-sugar constituents in accordance with certain affinities existing between respective constituents and the exchange material. More specifically with respect to affinities such exchange material discriminates between inorganic non-sugar ions and organic non-sugar constituents, as has been set forth in the co-pending patent application of Rawlings Ser. No. 479,093.

The Rawlings invention proposes the isolation and recovery of organic non-sugar constituents and more particularly of nitrogenous constituents, as more specifically exemplified by betaine, from the solution. The isolation and eventual recovery is effected by utilizing the preference of the exchange material for the inorganic ions over the organic constituents. Accordingly there results a stratification or zoning in the exhausted exchanger bed of respective heterogeneous non-sugar constituents, that is inorganic as against the organic constituents. The Rawlings invention proposes to pass, for instance, sugar juice through an ion exchange bed until the influent end portion thereof has become saturated with inorganic ions and the effluent end portion with organic constituents, and to discontinue the passage of the solution thus being treated before any appreciable portion of the organic constituents is displaced from the effluent zone. That is a continued flow of the solution through the exchanger bed would cause a corresponding growth in depth of the zone of inorganic ions in the bed, at the expense of the zone containing the organic constituents in the effluent portion of the bed. With the bed thus retaining substantially a relative maximum of the desired organic compounds from the solution, the organic constituents are then displaced from the bed by means of another solution containing ions having greater affinity to the exchange material than is possessed by the organic constituents, with the result that these displaced constituents can be intercepted in relatively high concentration in the corresponding portion of the effluent solution flowing from the bed.

The present invention may be said to represent an improvement upon or a refinement over the substance of the Rawlings invention above outlined, such refinement residing in the use of spent regenerant solution as an auxiliary solution for displacing the organic constituents from the bed in a manner to be hereinafter further explained.

An ionic exchanger is usually represented in the form of a unit or cell containing a bed of the exchanger material proper which is usually granular. An exchanger has the ability to absorb from the solution an ion of an ionized solute and to give off into the solution in exchange an ion of another kind even though of like electric charge. Therefore, cation exchangers as a class exchange positively charged ions, whereas anion exchangers as a class exchange negatively charged ions.

As the solution is passed through and contacted with the ion exchanger bed, the direct exchange of respective ions between the solution and the exchanger continues until the exchanger is saturated with absorbed ions and its exchange capacity thus exhausted. The exchange capacity can then be restored by treatment of the exchanger with a suitable regenerant solution. The saturation on the one hand, and the regeneration on the other hand, represent the main phases of the operating cycle of an exchanger, whereby the exchanger may be used over and over again. The chemical reactions involved in the operating cycle are reversible equilibrium reactions.

The treatment method for attaining the foregoing objects involves broadly the passing through an active ion exchanger bed of a solution having ionized matter desired to be isolated therefrom for collecting in that bed the ions of such material, then removing such ions from the exchanger bed in the form of a salt or a mixture of salts.

The objects proper of this invention are attained by treating a solution containing a mixture of solutes with ionic exchangers and utilizing in a special manner certain selective or preferential exchange characteristics thereof, in order to effect the desired isolation or fractionation of certain ionic constituents of the solutes in the form of salts or otherwise.

Such a fractionation problem occurs for instance in connection with the purification treatment of sugar bearing solutions, or sugar juices such as obtained from beet or cane, when it is desirable to isolate, for instance, such values as potassium, aconitic acid, betaine and others from the bulk of impurities dissolved in the juice, and which may also include Ca, Mg, Na and others. The invention is therefore herein illustrated by referring to the ionic exchange treatment of sugar juice, and such exemplification is herein not to be taken in any limiting sense.

Ionic exchange materials have inherent to them a natural order of exchange affinity with respect to various ionic substances contained in the solution. For instance, they have a preferential action for the alkaline earths, such as Ca and Mg over the alkali metals such as represented by K and Na, all of which may be contained in varying degrees as so-called impurities in sugar juices. Hence, from sugar juices the alkali metals with potassium as a value may be recovered separate from the alkaline earths. Aconitic acid and betaine may also be recovered from sugar juice.

More generally speaking, and in view of what has just been said with respect to the preferential characteristics, the progress of exhaustion of the bed can perhaps best be visualized, as follows:

The exhaustion or saturation of a fresh exchanger bed with the solution flowing downwardly therethrough proceeds in continuous fashion from the top to the bottom of the exchanger body. Hence, there exists, approximately speaking, a dividing line or relatively narrow zone of transition between the upper exhausted or saturated portion of the exchanger body and the lower non-exhausted or non-saturated portion of that body. This dividing line or zone keeps shifting downwardly through the exchanger body as the continuously through-flowing solution leaves an increasing exhausted exchanger portion behind as it advances through a correspondingly decreasing portion of non-exhausted or still active exchanger. However, as the dividing line is not necessarily a sharp one, there will be noticed a slowing down of the exchange intensity as the "break-through" point of the exchanger is being approached. This is a warning that the fresh or regenerated exchanger should be substituted for the one nearing saturation. The regeneration of a bed proceeds in a similar manner through the bed.

Now, after the exhaustion of the exchanger has proceeded part way down the bed, there will have been formed in the exhausted portion a number of strata corresponding to various ionic constituents that are being collected in the exchanger, the sequence of the strata corresponding to the order of affinities of the constituents with respect to the exchanger. That is to say, the constituent having the greatest affinity will be found to be substantially represented in the top strata, with the other constituents following in subsequent lower strata in the order of their affinity. As the solution continues to flow and the exhaustion proceeds accordingly, the various strata will appear to grow in depth until their aggregate depth will occupy the total effective depth of the bed, at which time the exchange capacity of the bed is to be considered exhausted.

The depth of the individual strata is substantially proportional to the degree of concentration of the respective constituents in the solution. The sequence depends upon the affinity of the constituents with respect to the exchanger, but such sequence may vary with the concentration. That is to say, as the concentration of a constituent in the solution is increased or decreased, that constituent may move up or down in the order of affinities with respect to the exchanger. Thus the order of affinity of two constituents with respect to an exchanger may be reversed by a change of their relative concentrations.

The apparent growth of the various strata is, in reality, a sequence or chain of successive ionic displacement actions, inasmuch as the growing top stratum displaces a portion of the subsequent stratum of ions of another constituent, which in turn passes the displacement on to the next stratum that is inferior with regard to its affinity to the exchanger, and so on down to the bottom stratum of the bed. In this way, as the respective strata or bands of the various ionic constituents widen, they also appear to be shifting downwardly through the bed until even the bottom stratum of the bed will have been saturated with the constituent of lowest affinity, at which time the basic exchange capacity of the exchanger will be considered as exhausted.

Just as there manifests itself a scale or order of affinity between various ions and the exchanger during the saturation phase, so does the exchanger conversely exhibit a corresponding selective reluctance or discrimination in releasing different ions under the pressure of ions of greater affinity during the regeneration phase. That is to say, if an exchanger bed has been saturated with a variety of ionic constituents taken up by the exchanger in a corresponding sequence of strata of the bed, when regenerant solution is started through the exchanger bed the first part or fraction of the spent regenerant solution will contain predominantly those ions for which the exchanger has the lowest affinity, and sequentially thereafter will contain the ions for which the exchanger has greater affinity. Again, this sequential discharge of various kinds of ions is due to a chain or sequence of ionic displacement actions, all in equilibrium with each other, whereby the regenerant solution displaces first the ions in the top strata, which have the highest affinity to the exchanger. The displaced ions of the top strata in turn displace a molar equivalent of the ions of the subsequent strata, that have a lower degree of affinity to the exchanger, and so on through the bed until again equilibrium is reached as the ions available for exchange in the regenerant solution will then all have been taken up by the exchanger.

Considering these preferential displacement or equilibrium conditions, it is possible according to this invention to cause the discharge and isolation of ions present in a bottom strata of an exhausted exchanger bed, by sending through the bed a solution containing ions adapted to displace any of the ions in the strata above, that is to say, by causing a displacement from the upper strata of the molar equivalent of the bottom strata ions to be isolated. Thus, if a solution is passed through the exhausted exchanger bed, containing a suitable concentration of cations having a greater affinity to the exchanger than the ions already present in the top strata, there will take place a corresponding molar displacement downwardly of the top strata ions, which displacement will be passed on through the strata further below and, as a result, a corresponding molar equivalent of ions from the bottom strata will eventually be discharged in the spent solution and recoverable therein as the desired fraction.

More specifically, let it be assumed the total depth of an exhausted cation exchanger bed consisted of three strata or bands of equal depth, the upper one representing ions of greatest affinity to the exchanger, the medium one representing ions of medium affinity, and the lower or bottom strata representing ions of relatively lowest affinity. If a solution were then sent downward through the exchanger bed, the solution containing solely cations of the type of the first strata and containing them in a suitable concentration and in a quantity representing the molar equivalent of the cations already present in the upper strata, then the cations of that solution would have no effect upon the ions of the same kind or affinity order in the top strata. But they would displace the intermediate strata of lower affinity, which in turn would displace the ions of the lower or bottom strata of lowest affinity, and then the molar equivalent of the ions displaced from the bottom strata would be found in the spent solution as an isolated fraction. In this way, by sending a predetermined solution through the exhausted bed, a desired bottom fraction of the ions in the exchanger bed can be displaced therefrom and intercepted or isolated for the possible recovery of the isolated ions as salts or otherwise. In principle then, it is only necessary that the solution to cause this displacement have ions of greater affinity to the exchanger than the ions to be isolated, and have them in a quantity corresponding at least to the molar equivalent of the ions to be displaced.

This invention has also to do with beds that make use of granular ion exchange material that is of organic nature and is of that type now newly called organolites in distinction from the inorganic base exchangers heretofore known as zeolites. Organolites are being proposed currently, for instance, in sugar making, a use that will now be described as an example by which to convey an understanding of the ionic environment of this invention, and of the chemical exchange mechanism involved in the use of the exchangers. In extracting non-sugars and especially dissolved salts from sugar making juice or syrup, two main types of ion-exchange beds are used. One that is called the cation exchanger bed is characterized by its use of ionic exchanger material that operates on the hydrogen ion cycle and is adapted to collect from the juice positively charged ions (called cations) represented generally by calcium, magnesium, sodium and potassium. That is, as juice is supplied to the cation exchanger bed (or cell that contains the bed) so as to pass through it and out therefrom, cations of dissolved salts of the juice exchange themselves for hydrogen ions of the exchanger until the exchanger bed becomes exhausted of its exchange capacity and is so saturated with cations that it ceases substantially to exercise further exchange activity. Thereupon the cation bed must be regenerated by contact with a regenerant in the form of an ionized strong acid such as hydrochloric or sulphuric acids. During regeneration, the reverse equilibrium process takes place in the exchanger, namely, the cation taken up by the exchanger with hydrogen ions of the acid regenerant so that the cations flow from the bed until the bed is substantially completely recharged with hydrogen ions.

Juice that passes from the cation bed has had its impurity content of cations substantially removed and replaced by a molar equivalent of hydrogen ions, but it yet contains sulphates, chlorides and other such negative ionic impurities. So the juice substantially rid of its positive ionic or cation impurities that have been left behind, is contacted with an anion exchanger bed or cell that operates in the hydroxyl cycle. In passing through the anion bed, the negatively charged ions of the dissolved salts of the juice (called anions) are exchanged for the hydroxyl ions of the bed until the anion bed becomes saturated with sulphates, chlorides and the like anions. Thereupon the saturated anion bed must be regenerated by contact with some ionized alkali hydroxide or carbonate, especially sodium hydroxide or carbonate. During regeneration, the reverse equilibrium process takes place, namely, the residual chloride and sulphate anions in the bed exchange with hydroxyl ions of the basic regenerant so that the collected negative ions or anions flow from the bed until the anion bed is substantially re-charged with hydroxyl ions. In passing through the anion bed, the juice is substantially rid of its negative or acid forming anions since they have been left in the exchanger. Thus, the basic or positive ions of the juice are removed from it while passing through a cation exchanger bed and the negative or acid forming ions are removed from it while passing through a subsequent anion exchanger bed. In other words, the cations of the salts are replaced by H-ions (in the hydrogen ion cycle) while the anions of the salts are replaced by OH-ions (in the hydroxyl ion cycle), with the net result that the salts are replaced with HOH (or $H_2O$), that is the molar equivalent in pure and evaporable water. Other substances are also removed from the juice by this particular treatment, that surprisingly are non-ionic, such as color imparting constituents and colloids.

In a particular embodiment the invention also comprises a system of countercurrent regeneration whereby an unexpected economy can be realized with regard to the operation of the fractionation steps proper of this invention. The principle of countercurrent regeneration per se has been disclosed in the patent application of F. N. Rawlings Ser. No. 383,087, filed March 13, 1941. Countercurrent regeneration permits of far-reaching utilization or conversion of the regenerant solution, and in other words, makes possible a high efficiency of regeneration. A spent regenerant solution that is well converted will in turn make possible certain economies in conjunction with the fractionation of solutes according to this invention, as will be further explained. Because of this importance an outline of countercurrent regeneration is given as follows:

This countercurrent regeneration procedure essentially means that, in order to regenerate an exhausted exchanger, the exchanger is first contacted with a largely, but not entirely, spent solution obtained from a previous exchanger treatment. This solution would contain on the one hand some of the salt, base or acid used for regeneration, and on the other hand some of the resultant products of regeneration. This solution contains the unused regenerant chemical in a relatively low molar concentration which, however, is high enough to initiate the regeneration of, or to partially regenerate, the exhausted exchanger. Because this partly spent solution is the first one to be applied to the exchanger, it shall herein be called the first stage regenerating solution. When this partly spent or first stage regenerating solution is passed through the exchanger the remainder of the unused regenerant chemical in the solution will have been largely converted to the products resulting from regeneration. An exchanger so treated will be partially regenerated.

After the first stage regenerating solution has been contacted with the exchanger bed, the bed is given a second treatment with a fresh regenerating solution to complete the regeneration. The solution resulting from this completion of the regeneration becomes the partly spent or first stage regenerating solution to be used as such in the treatment of the next exchanger bed to be regenerated.

What has just been desribed may be called a two-stage process, but correspondingly three or more stages can be used. Accordingly, there may be used successively a second and third stage partially used regenerating solution of consecutively greater strength, having been subjected to corresponding smaller degrees of conversion. The solution used in the last stage of regeneration of this exchanger is strong enough to effectively complete the regeneration of the exchanger, and this solution may be in the form of fresh solution of suitable strength. The essence of the countercurrent regeneration is that the strong regenerant solution is re-used by passing it in effect through a succession of exchanger beds in various stages of regeneration. That is to say, the strongest regenerant solution contacts the least exhausted bed, while the weakest regenerant solution contacts the most exhausted bed. The regenerant chemical in the solution is accordingly stage-wise converted while the total molar concentration in the solution remains substantially constant.

It is desirable that the exchanger bed be submerged in liquid at all times, so that no air will become entrapped in the voids of the bed. Therefore, the regeneration is conducted in such a manner that one fraction of the regenerant solution is displaced from the bed by the next stronger fraction. After the fully regenerated condition of the exchanger has been reached, the exchanger must be washed free of the regenerant solution in it, that is to say, the remaining volume of strong regenerant solution that still fills the voids in the exchanger, must be displaced by wash water, whereupon the exchanger is again ready for use.

While the exchanger material takes up from the sugar juice inorganic ions by way of ionic exchange, it also takes up dissolved organic matter or impurities including nitrogenous matter. In that instance and when using for instance such exchanger materials as organic synthetic resins, the exchanger material is found to have an affinity or preference for the inorganic ions over the organic matter. This order of affinity manifests itself in that an exhausted exchanger bed will have accumulated inorganic matter at the influent end portion, whereas organic matter will have accumulated at the effluent end portion, under the condition that the flow of juice through the bed should have been maintained for a period of time adequate to produce that phenomenon. That is to say, the exhausted condition of the bed as herein considered is that condition which results when the period of juice flow from the bed has been long enough to have caused a desired quantity of the organic matter to be accumulated in the effluent portion of the bed but not so long as to have caused the thus accumulated organic matter to be again displaced from the bed and into the spent liquor owing to the excessive growth of the strata of inorganic matter accumulating in the bed. In this way, organic matter, or as it were, nitrogenous matter and notably betaine may collect in the effluent end portion of the cation exchanger bed in appreciable quantity. Subsequently therefore, such matter will be found in relatively high concentration in the initial portion of spent regenerant liquor flowing from the bed. Intercepting that portion of the effluent represents a way of isolating and recovering in relatively high concentration such organic or nitrogenous matter. More in particular, such by-product values as betaine are thus recoverable from a cation exchanger bed through which the sugar juice is passed.

The objects of this invention are attained by sending or recirculating spent regenerant solution through exhausted exchangers from which ions or the lower strata of the bed are to be isolated. This spent solution herein also termed the auxiliary solution, contains a proportion of ions the affinity of which to the exchanger is greater than the affinity of the ions in the bottom strata, and which are to be isolated or fractionated. Therefore, the ion in the auxiliary solution passing through the bed will cause the displacement of a molar equivalent of ion from the bottom strata of the bed, which displaced molar equivalent represents the fraction of the ions to be isolated. This fraction can be further treated as by concentration, or otherwise, in order to effect recovery of desirable values therein.

Some features of the invention relate to the conditioning or chemical adjusting of the spent regenerant solution, for the purpose of obtaining a suitable auxiliary regenerant solution to effect the chemical exchange displacement desired in the exchanger bed to result in a desired fractionation or isolation of ions therefrom. This involves neutralizing or partially neutralizing residual or unconverted acid or alkali in the spent regenerant solution and also adjusting the dilution prior to applying this auxiliary solution to the exhausted exchanger for the purpose of fractionation.

According to another feature the fractionation of ions from an exhaustion exchanger bed, is functionally coupled with a countercurrent regeneration system such as above referred to, by means of which spent regenerant required as auxiliary solution is obtained in a condition in which it is so well utilized or converted as to require a relatively small, if any, amount of neutralizing agent to condition it as auxiliary solution to be applied to the exhausted exchanger bed for the purpose of fractionation.

Still other features relate to the fractionation or isolation and recovery of by-product values in connection with a purification treatment by means of ionic exchangers of sugar bearing juices or syrups. Some of the potential values recoverable from sugar juice as a source, are potassium, betaine, aconitic acid and various nitrogen-bearing matter.

As illustrative of a form of construction by which the invention hereof may be realized, reference is made to the accompanying drawings constituting a part of this specification, and in which drawings.

Figure 1:
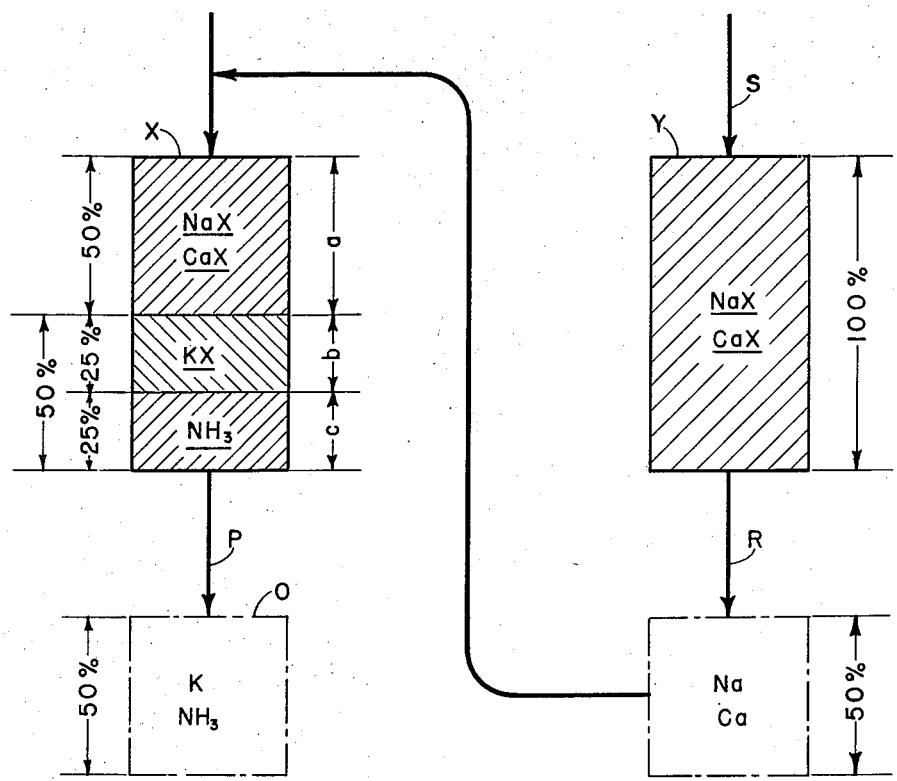
Fig. 1 is a diagrammatic example of the principle of ionic displacement induced in the exchanger bed, to effect fractionation of constituents therefrom.

So that the underlying principle of this invention may be more readily understood, there is shown in Fig. 1 a general diagrammatic example of how a variety of ions, for instance of the cation class, range themselves in strata in the exchanger bed, in the order of their affinity of their exchanger, and how subsequently they can be fractionated or isolated by controlled ionic displacement whereby the ions of lower affinity are displaced by ions having greater affinity to the exchanger.

Referring to Fig. 1, let 50% of the capacity of a fully exhausted exchanger bed X be saturated with Na-plus Ca-ions, corresponding to half the depth of the bed represented by the top stratum $a$. Let the lower half of the bed X be saturated with K- and with $NH_3$-ions so stratified that K occupies a stratum or band $b$ of 25% of the depth of the bed, and $NH_3$ occupies the remaining 25% below.

Let it further be assumed that another exchanger bed Y of equal capacity be saturated and exhausted throughout with Na-plus Ca-ions from a previous operation. If this bed Y is then regenerated with HCl solution designated as S, then the spent regenerant liquor flowing from the bed may be considered as the auxiliary solution since it contains all the Na plus Ca which it has displaced from the bed in exchange for H ion. If 50% total Na-plus Ca-ions removed from the exchanger bed Y and present in the spent regenerant solution R is then sent downwardly through the exhausted exchanger bed X, it will pass substantially inertly through the upper stratum $a$ because of the presence therein of the Na and Ca. But in passing through the further strata $b$ and $c$ it displaces therefrom the K- and $NH_3$-ions because of the greater affinity of the Na and Ca to the exchanger. The displaced K- and $NH_3$-ion will then be found present in the spent solution flowing from the exchanger bed $X_3$ as the bed X is left fully saturated with Na and Ca and thus in a condition to be regenerated with HCl solution and utilized in the manner of bed Y in a subsequent operating cycle. The displaced K- and $NH_3$-ion are represented as volume F in terms of spent solution, and that volume represents a fraction comprising the K- and $NH_3$-ion desired to be isolated.

Figure 2:
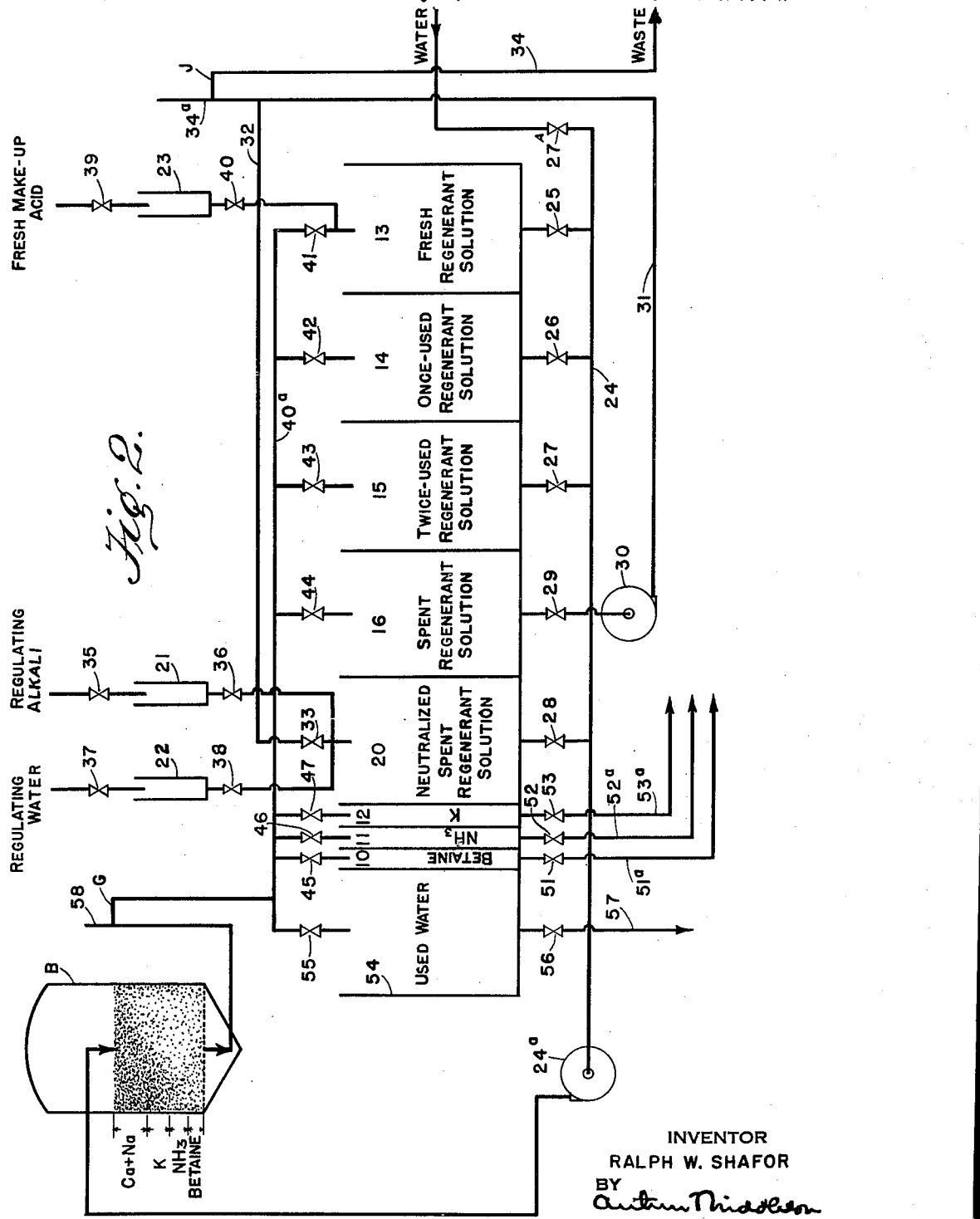
Fig. 2 illustrates the invention more fully as applied to the regeneration phase of organolite cation exchanger bed that has been saturated with non-sucrose impurities in the process of sugar juice purification treatment.

The flow-sheet of Fig. 2 illustrates the invention as applied to the problem of fractionation or by-product recovery incident to the ionic purification treatment of sugar juice by means of organolites, that is the isolation of values from the impurities removable from the juice by the ionic exchange treatment.

One of a variety of organic cation exchangers considered suitable for the present purpose is of the resinous type such as exemplified in the United States patent to Holmes No. 2,191,853, where the exchanger is described as a synthetic resin of the polyhydric phenol formaldehyde type which is sulphited to a degree such that its sulphur content is not less than 2.4%. An organic anion exchanger considered suitable for the present purpose is also of the resinous type and is exemplified in the United States patent to Adams and Holmes No. 2,151,883, describing the exchanger as an insoluble resin-like product obtained by the reaction of formaldehyde with an aromatic amine. Exchangers of the type contemplated for use in connection with the present invention, are substantially stable in the presence of acids and alkalis.

Other suitable organolite exchangers are: The cation exchanger produced by the Resinous Products Corp. of Philadelphia under the name or identification of Amberlite IR.1, and the anion exchanger Amberlite IR.4 from the same source.

The invention is represented in Figure 2 in connection with the regeneration phase of a cation exchanger of the organolite class, the exchanger bed being designated as B. However, it is to be understood that the invention can be applied as well to an anion operating cycle, and also in connection with the use of zeolites.

A solution such as sugar juice containing a mixture of solutes or non-sucrose impurities is assumed to have passed through the exchanger bed B leaving the bed in the exhausted condition indicating in Figure 2 that various ionic constituents have been taken up by the exchanger in consecutive strata in the order of their affinity to the exchanger. By way of example, the exchanger bed is herein shown to have the top stratum saturated with Na and Ca ions, and to have potassium (K), ammonia ($NH_3$), and betaine, respectively, in the strata below. The aggregate depth of these strata represents the total depth of the exchanger bed.

The constituents K, $NH_3$, and betaine, present in the respective three lower strata are the ones to be fractionated or isolated either in bulk or each of them individually. That is to say, depending upon how the fraction of fractions are to be intercepted in the spent liquor flowing from the exchanger bed, one may visualize either a single fraction being intercepted that contains all three constituents, K, $NH_3$, and betaine, or each of these constituents as being intercepted as an individual fraction. Other possible variations are to have the betaine isolated in the first fraction, and the $NH_3$ and K together in a following fraction, or vice versa, the betaine and the $NH_3$ might be isolated together in a first fraction, with the K alone to follow in the subsequent fraction.

If the betaine, which is substantially present in the bottom strata of the exchanger bed, is the sole value sought to be isolated and recovered, then a corresponding ionic displacement must be effected for recovering just that constituent in a corresponding fraction of intercepted spent liquor.

Since the isolation of the three constituents each individually—K, $NH_3$, and betaine—is herein taken as an example, there are consequently provided three interceptor or fractionation tanks 10, 11, and 12, to receive the respective fractions of spent liquor.

Furthermore, there are provided tanks 13, 14, 15, 16, for receiving regenerant solution in various stages of conversion, such as occur in the practice of counter-current regeneration aforementioned. In this system, tank 13, for example, receives a 5% fresh regenerant HCl solution, tank 14 a partially converted or once-used regenerant solution obtained from a previous regeneration cycle, tank 15 a still further converted or twice-used regenerant solution from a previous regeneration cycle, and tank 16 the spent regenerant solution containing residual unconverted chemical too dilute for use in a further regeneration cycle. For example, in counter-current regeneration a 5% HCl regenerant solution may be converted to about 1 to 1.5% HCl content with regeneration of the bed proceeding effectively, whereas straight regeneration (that is regeneration of an exhausted exchanger bed directly with fresh or strong 5% regenerant solution) could by comparison be carried only to about 2 to 2.5% HCl content in the spent liquor. The spent regenerant solution, according to this invention, serves as an auxiliary regenerant solution for effecting the ionic displacement from the exhausted exchanger bed B of one or more fractions representing different ionic constituents. This displacement is effected due to the contents in the spent or auxiliary regenerant solution of a proportion of ions of a higher order of affinity to the exchanger than is possessed by the ionic constituents to be fractionated from the exchanger. The interceptor tanks 10, 11, and 12 may be operated to receive the spent liquor fractions containing the K, NH3, and betaine respectively.

There is further provided a tank 20 to which the spent regenerant solution from tank 16 can be transferred after the residual regenerant chemical (HCl) has been neutralized, and otherwise conditioned as with respect to its dilution, so as to serve more effectively as the auxiliary regenerant solution. Hence, there is also shown a measuring tank 21 for dosing a neutralizing agent such as an acid or an alkali as the case may be, and a measuring tank 22 for diluting water. A measuring tank 23 supplies the required dose of fresh regenerant acid (HCl) to make up the fresh regenerant solution in tank 13.

A header 24 supplies regenerant solution in consecutive stages from the various tanks 13, 14, 15, and 20, by means of a pump 24a to the top of and onto the exchanger bed B, connections being provided between the header and the respective tank bottoms. A discharge control valve 25 is provided for the fresh solution tank 13, a valve 26 for discharging once-used solution from tank 14, and a valve 27 for discharging twice-used solution from tank 15. A valve 28 is provided for discharging neutralized spent liquor (that is auxiliary regenerant solution) from tank 20 to the exchanger bed. Wash water for the exchanger bed can be admitted into the header 24 through a valve 27A.

Provision is made for the spent liquor solution from tank 16 to be transferred through a control valve 29, a pump 30, pipe connections 31 and 32 and another control valve 33 to the tank 20. A portion of the spent regenerant solution from the cyclic system is sent to waste through a discharge connection 34. The admission of a regulating dose of alkali into the measuring tank 21 is controlled by a valve 35, and into tank 20 by a valve 36. The admission of diluting water into the measuring tank 22 is controlled by a valve 37, and into the tank 20 by a valve 38. The admission of fresh make-up acid (HCl) into the measuring tank 23 is controlled by a valve 39, and into the tank 13 by a valve 40.

Furthermore, there is provided a supply header 40a for admitting regenerant solution in various stages of conversion, leading from the bottom of the exchanger bed to the respective tanks 13, 14, 15, and 16. The admission of strong solution into tank 13 is controlled through a valve 41, and the exact source of this strong solution or of portions thereof will herein be further explained. Once-used solution from the exchanger bed is supplied to the tank 14 through a valve 42, to be further utilized in a subsequent exchange cycle. Twice-used solution is supplied into tank 15 through a valve 43, also for use in a subsequent cycle. Spent regenerant solution is supplied to tank 16 through a valve 44, part of which solution serves as auxiliary regenerant solution in the fractionation steps, the balance to be discharged from the system through line 44. Valves 45, 46, 47, also connected with the header 40a admit spent liquor fractions containing K, NH3, and betaine respectively into the interceptor tanks 10, 11, and 12 respectively, which tanks in turn are provided with bottom discharge valves 51, 52, 53, and with corresponding discharge connections 51a, 52a and 53a. There is also provided a tank 54 to receive used wash water from the exchanger bed, through the header 40a and a valve 55. The tank has a discharge valve 56 and discharge connection 57. A goose-neck G through which the liquid discharging from the exchanger bed B must pass, is so designed as to normally insure submersion of the exchanger material at all times. The goose-neck G has a vent 58 to break the syphoning effect thereof.

*Operation*

Inasmuch as the principle of ionic displacement herein employed will be clear from what has been said in the foregoing with respect to Fig. 1, it will suffice to describe the operation on the basis of the flowsheet in Fig. 2 pertaining specifically to an example in which an organolite cation exchanger is exhausted incident to the purification treatment of sugar juice, whereby dissolved non-sucrose impurities or salts are removed from the juice, that is to say, sugar juice has been passed downwardly through the cation exchanger, whereby the exchanger has become saturated with a variety of cations in strata corresponding to the affinity of the respective cations to the exchanger. In this example Na- and Ca-ions are found largely in a top stratum of appreciable depth, while the strata below are represented by K, NH3, and betaine respectively. At this point of the operating cycle the tank 13 should be assumed to have been filled with the required volume of fresh acid (HCl) regenerant solution of, say, 5% concentration. At the same time, tank 14 is assumed to be filled with what is herein called once-used regenerant solution such as has been obtained from a previous operating cycle, and tank 15 should be filled at this time with twice-used regenerant solution, also obtained as such from a previous operating cycle. Tank 16 is emptied at this time, but tank 20 is filled with spent regenerant solution from a previous cycle, which spent solution according to the invention, should have had its residual or unconverted acid (HCl) neutralized and its dilution adjusted so that it represents auxiliary regenerant solution suited to the exchange characteristics of the exchanger and for the present purpose of fractionation which is the object of this invention.

At this time the voids in the exchanger bed B are assumed to be filled with residual wash water which now must be displaced downwardly from the bed incident to the passage therethrough of the neutralized spent regenerant solution. The displaced wash water may be intercepted in tank 54 into which it can be admitted through the valve 55. At the proper time the flow of liquid discharging from the exchanger bed is switched to and through the valve 45 into the first interceptor tank 10, that is, when the residual wash water has been displaced and the spent liquor fraction containing the betaine begins to flow from the bed. In this way, the betaine-containing fraction of the discharging spent liquor is intercepted in tank 10 until the content of the discharging liquor begins to change from betaine to NH₃ which is the next constituent to be intercepted and isolated. Consequently, at this point the discharging spent liquor is switched through valve 46 into the second interceptor tank 11 where now the outflowing NH₃-containing fraction accumulates. In a similar manner the flow is then again switched through valve 47 into the third interceptor tank 12 in which to accumulate the K-containing fraction of the spent liquor. When this latter fraction has been substantially intercepted, the flow from tank 20 of auxiliary regenerant solution through the bed is stopped, as the exchanger bed will now have been saturated substantially through its entire depth with Na- and Ca-ions assumed to have been present in sufficient quantity in the auxiliary regenerant solution to effect the displacement and fractionation of the K, NH₃, and betaine as just described.

From what has been said before about the mechanism of successive displacement effects in the exchanger bed B, it will be understood why the fractions representing the various constituents discharge from the bed in the order described. That is to say, the Na- and Ca-ions sufficiently present in the auxiliary solution pass inertly through the upper strata of the exchanger, already saturated with Na- and Ca- from the juice purification treatment, but in continuing downward through the bed, they first displace the K-ions which in turn displace the NH-ions in the next stratum, passing the displacement further on to the betaine in the bottom stratum, causing the betaine eventually to emerge from the bed as the first fraction to be intercepted in tank 10. By virtue of the same displacement mechanism, the next spent liquor fraction containing the NH₃, and the third spent liquor fraction containing the K, are successively intercepted in tanks 11 and 12 respectively. Finally, when all three fractions have been displaced and intercepted, substantially the entire depth of the bed will be found to have become saturated with Na and Ca. The intercepted fractions in the tanks 10, 11 and 12 can be individually concentrated for the recovery of the respective values or salts.

If the molar equivalent needed for displacing the three fractions K, NH₃ and betaine, is known, then it is possible to predetermine the volume and character of the auxiliary regenerant solution, that is, the neutralized spent regenerant solution which must be sufficient to effect the desired displacement and fractionation. Following directly upon this auxiliary solution effecting fractionation, there is then passed through the exchanger bed the twice-used (that is, largely converted) regenerant solution from tank 15 from which it is drawn thru the valve 27 by the pump 24a. This twice-used solution will displace from the bed any of the aforementioned spent liquor fractions or else any excess or residual unconverted auxiliary regenerant solution. Again the break or interception is made with respect to the liquid discharging from the bed, when the spent liquor emerges from the bed as true spent regenerant solution which as such will contain largely Ca and Na as chlorides due to initial regeneration now taking place in the bed to the extent that the H-ions of the regenerant acid (HCl) are available in the twice-used regenerant solution. This break or interception means that what now emerges from the bed as true spent regenerant solution is sent through the header 40a and the valve 44 into the empty spent regenerant solution tank 16.

The portion needed of this spent regenerant solution as auxiliary regenerant solution for effecting the fractionation as above described, is sent through discharge valve 29 by means of the pump 30 through lines 31 and 32 and through valve 33 into tank 20 where the residual unconverted acid (HCl) in it is neutralized with a suitable alkali from the measuring tank 21, and the solution diluted, if desired, from the measuring tank 22. The balance of the spent regenerant solution coming from the tank 16, and not needed, begins to discharge from the system as indicated by the line 34. The discharge line 34 is formed with a gooseneck J through which spent regenerant solution from tank 16 begins to flow when the valve 33 is closed while the pump 30 continues running. The goose-neck J has a vent 34a to break the syphoning effect thereof. The spent regenerant solution that has been conditioned into neutralized spent solution in tank 20 is then ready to be used over again as auxiliary regenerant solution in a new cation exchanger operating cycle.

Since through dilution (note the regulating water valve 37) one may vary the relative affinity of the ions in the auxiliary regenerant solution with respect to the exchanger, it can be visualized that by such control the ions in the auxiliary regenerant solution may be assigned a desired place in the order of affinity. Consequently, such control or affinity adjustment should make it possible to leave unaffected any desirable depth of the exchanger, and to have the chemical displacement action take place, for instance, only when the auxiliary regenerant solution substantially reaches the particular strata containing the fraction of ions or molecules to be displaced. It is thus visualized that the auxiliary regenerant solution should flow substantially inertly (that is, without exerting displacement or exchange function) through that depth or strata of the bed, that overlies that strata containing the ions or molecules to be displaced as a recovered fraction. In other words, in this way one may control or predetermine the point of depth in the bed, at which or from which on, a desired displacement action by the auxiliary regenerant solution should be effected.

The twice-used or largely converted regenerant solution from tank 15 passing through the bed will have caused the initial regeneration of the exchanger bed with H-ion. Any of the residual second-used solution in the bed is then followed up with and displaced by once-used, that is, less converted, regenerant solution from tank 14, in order to further advance the regeneration of the exchanger bed. Consequently, there will now flow from the bed a solution equivalent in HCl strength to twice-used solution and as such it is discharged through valve 43 into the now empty tank 15.

The residual solution from this regeneration step is then displaced from the bed by fresh or strong regenerant solution from tank 13 to finish the regeneration of the bed. Again the break or interception is made with respect to the solution now flowing from the bed when this final regenerant solution emerges with the HCl content reduced to what is equivalent to once-used solution, and as such, it is sent to the now empty tank 14 for use in a subsequent operating cycle, while being followed up with and displaced by wash water from the header 24. However, when the regeneration of the exchanger bed from top to bottom is thus completed in this last step, the voids of the bed will still be filled to some extent with trailing unconverted HCl solution which, with the wash water, forms a weak solution. By continuing to pump wash water this weak solution is displaced from the bed and supplied through the header 40a, and valve 41 to the fresh solution tank 13 until the tank is filled to its predetermined mark. Fresh make-up acid is then added from the measuring tank 23 to bring it up to the strength required for the fresh regenerant solution.

The use of counter-current regeneration in connection with this invention makes it possible to conduct the step of neutralizing the spent regenerant solution with a high degree of economy. That is to say, since the regenerant chemical (HCl) has been converted to a particularly large extent by counter-current operation, the small residual unconverted HCl portion in the spent regenerant solution requires a corresponding but small quantity of neutralizing agent. However, it is within the scope of this invention that the neutralizing or conditioning step be dispensed with, and the true regenerant solution from tank 16 be used as such, that is substantially without chemical adjustments, to serve as the auxiliary regenerant solution either with or without additional controlled dilution thereof.

While the invention so far has been described substantially on the basis of the chemical mechanism that controls straight ionic exchange or ion displacement effects taking place in the exchanger, it is to be understood that the displacement or fractionation, to be effective according to this invention with the aid of spent regenerant solution as an auxiliary, may also include constituents which do not exactly follow the law herein set forth of selective or preferential ionic exchange. That is to say, some values to be fractionated from the exchanger may be found to have been absorbed directly, that is, in their molecular state, by certain strata of the exchanger, and it is observed that somehow these constituents have a place in the order of affinity with respect to the exchanger. In some cases, such molecular constituents will appear to take their place at the end of the line, namely, after all true ionic exchange has taken place in the exchanger, and consequently such constituents may be found in the bottom portion or strata of the exchanger bed whence they may be most readily removed or displaced by the treatment method according to this invention.

I claim:

1. The process of treating a sugar-bearing solution containing dissolved nitrogenous along with ionized inorganic non-sugar constituents to effect the isolation of nitrogenous constituents, which comprises passing the solution through a quantity of granular hydrogen ion exchange material substantially saturated with H-ions so that inorganic constituents are retained in the influent zone while nitrogenous constituents are retained in the effluent zone of the material approximately until nitrogenous constituents start to pass from said effluent zone, then passing through said effluent zone an auxiliary solution of substantially the same composition as the regenerant solution later produced to displace nitrogenous constituents in said effluent zone by inorganic cations, isolating a resulting effluent portion containing the displaced nitrogenous constituents for the recovery of such constituents, and regenerating the exchange material to restore its H-ion exchange capacity by passing therethrough as acid regenerant solution, whereby there is produced an effluent of substantially spent regenerant solution substantially in the nature of said auxiliary solution.

2. The process according to claim 1, in which the organic constituents isolated are derived from the cation exchange material and comprise substantially betaine.

3. The process according to claim 1, with the additional steps of neutralizing unconverted acid regenerant chemical in said auxiliary solution prior to contacting the solution with the exchange material.

4. The method according to claim 1, with the additional step of diluting said auxiliary solution to effect a desired degree of concentration of the solutes therein prior to contacting it with the exchange material.

5. The method according to claim 1, in which the regeneration is effected by first passing through the exhausted material partially spent regenerant solution obtained from previous regeneration whereby largely spent effluent liquor is obtained, and then passing through it stronger regenerant solution, in which said auxiliary solution comprises a quantity of said largely spent liquor, with the additional step of neutralizing any unconverted acid regenerant chemical in said auxiliary solution prior to contacting the solution with the exchange material.

RALPH W. SHAFOR.